United States Patent [19]

McDonald

[11] 4,320,258
[45] Mar. 16, 1982

[54] ARRANGEMENT FOR REQUESTING SERVICE FOR CALLED TELEPHONE SUBSCRIBERS

[75] Inventor: Henry S. McDonald, Summit, N.J.

[73] Assignee: Bell Telephone Laboratories, Incorporated, Murray Hill, N.J.

[21] Appl. No.: 166,750

[22] Filed: Jul. 7, 1980

[51] Int. Cl.³ .................. H04M 3/04; H04M 3/42
[52] U.S. Cl. .......................... 179/18 B; 179/18 HB
[58] Field of Search .............. 179/18 B, 5.5, 18 BE, 179/18 HB

[56] References Cited

U.S. PATENT DOCUMENTS

| 3,378,650 | 4/1968 | Goeller | 179/175.2 R |
| 3,963,875 | 6/1976 | Gueldenpfennig | 179/27 CA |
| 4,054,756 | 10/1977 | Comella et al. | 179/18 B |
| 4,071,699 | 1/1978 | Jovic et al. | 179/5.5 |

FOREIGN PATENT DOCUMENTS 2538820 3/1977 Fed. Rep. of Germany ....... 179/5.5

*Primary Examiner*—Thomas W. Brown
*Attorney, Agent, or Firm*—Roy C. Lipton

[57] ABSTRACT

An improved ringing control circuit in a stored program telephone switching system which provides a called subscriber an interval or window of time after answering a call to send a request for special services such as identification of the number of the calling party. This time interval, initiated when ringing is tripped, delays operation of current sensitive devices which sense current flow in the subscriber line when the party answers the call. This delays completion of the connection by the systems processor which periodically scans the conditions of the current sensitive devices. A detecting device is also provided in the control circuit to detect receipt of the request for service signal during the time interval.

7 Claims, 2 Drawing Figures

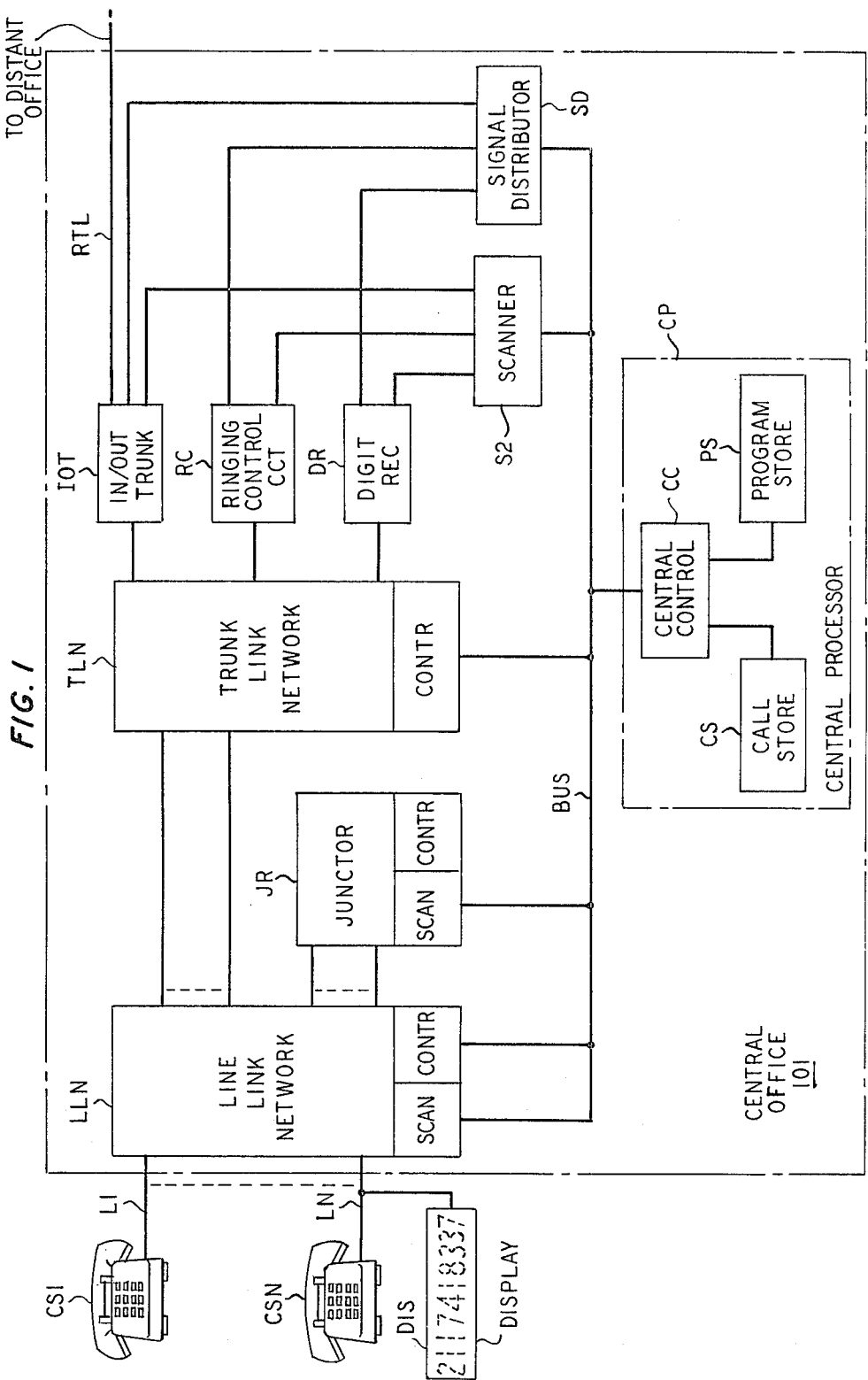

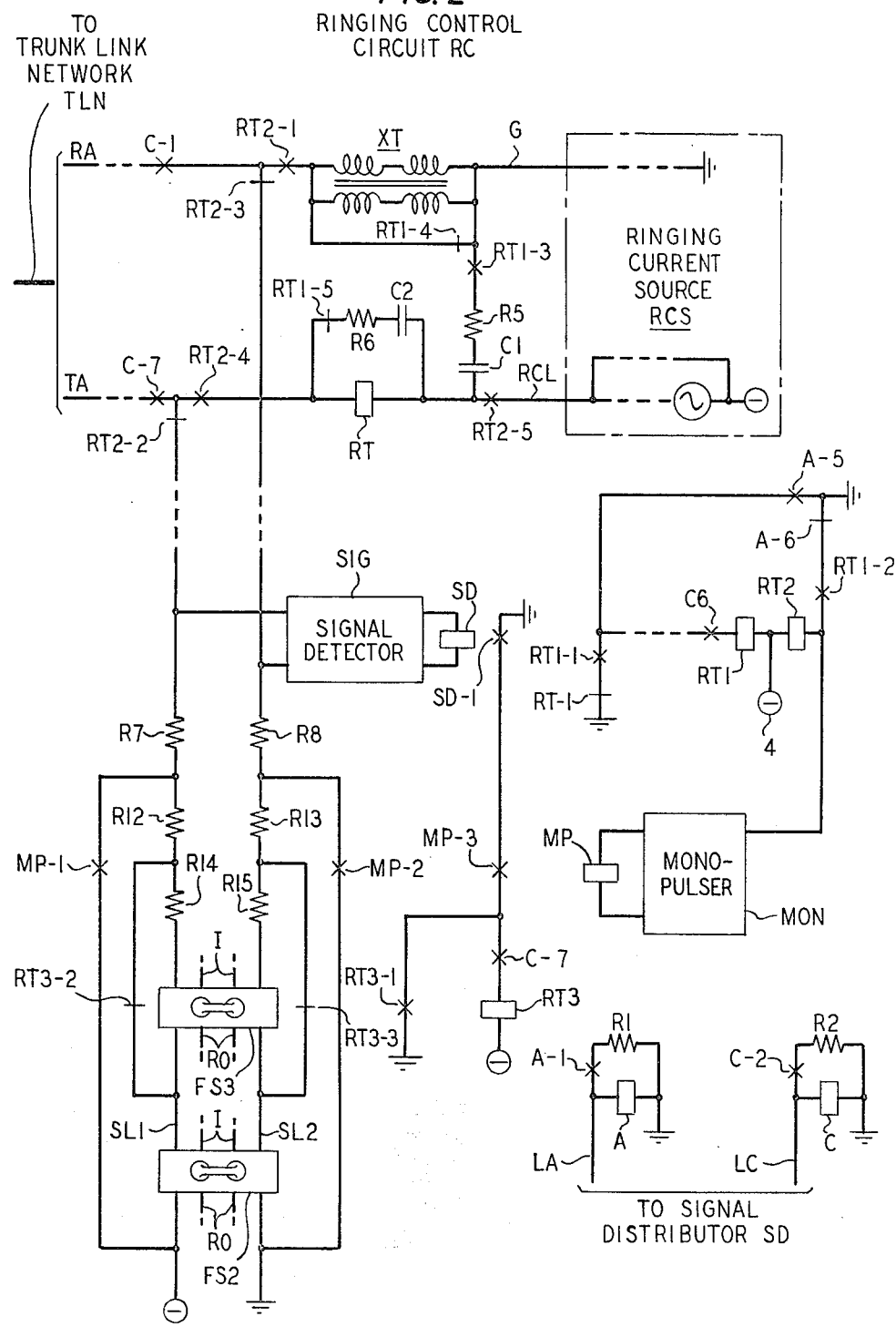

ARRANGEMENT FOR REQUESTING SERVICE FOR CALLED TELEPHONE SUBSCRIBERS

TECHNICAL FIELD

This invention relates to apparatus in a communication system for receiving special service requests from called subscribers.

BACKGROUND OF THE INVENTION

The introduction of stored program controlled communication networks is allowing the common carriers to offer many automated special services to the subscribers. It has been suggested that various automated special services be offered to the called subscriber; these services including identification of the number of the calling party, options to accept calls and requests to transfer or forward calls to a third party.

One common attribute of these special services is that the called subscriber makes the service request after answering the call. Typically, the called party, upon anwering the call, sends an appropriate dialing digit (multifrequency signal) to request a special service register in the carrier office and then sends digits to the register to identify the special service desired. It is often advantageous to the called subscriber, in the provision of these services, that there be an opportunity for request for service to be made (and the service performed) before any talking connection is completed to the calling party. Accordingly, with respect to the provision of these services, apparatus is interposed between the calling and called parties to recognize or detect requests for service. This apparatus functions, in part, to preclude the completion of the connection between the parties, for some predefined interval of time, to provide the called party an opportunity to make a request for service and to enable the service request to be identified and handled. This apparatus, however, tends to be complex and expensive and, in addition, to be nonstandard equipment requiring substantial change in central office arrangements and program procedures.

It is therefore an object of this invention to provide handling of special service requests from called subscribers without substantial modification of office equipment and procedures.

Stored program controlled switching offices have utilized ringing control circuits to provide ringing signals to the called subscriber, to recognize or sense the answer of the subscriber and to thereupon trip the ringing. The connection is completed by the office common control equipment upon scanning the condition of a ringing control circuit sensing device, which condition manifests the answering of the call.

It is another object of this invention to improve ringing control circuits to provide appropriate procedures for detecting or recognizing requests for special services from called subscribers.

SUMMARY OF THE INVENTION

The achievements of the objects of this invention are provided by an improved ringing control circuit which delays the manifestation of the answering of the call to provide the called subscriber an interval of time to signal a request for service before completion of the call connection. Provision is made to detect receipt of the request for service signal during this time interval. It is an advantage of this invention that, in the absence of such request, and after the time interval, completion of the call may proceed in the conventional manner.

In accrdance with the specific embodiment of this invention disclosed herein, a further device is provided to manifest the receipt of the request for service signal to advise the common control equipment that a request for service has been received from the called subscriber. It is therefore a further advantage of this invention that the special apparatus for identifying and handling the special service is called upon only when a request for service is made by the subscriber.

The foregoing and other objects and features of this invention will be more fully understood from the following description of the illustrative embodiment taken in conjunction with the accompanying drawing.

BRIEF DESCRIPTION OF THE DRAWING

FIG. 1 discloses, in schematic block form, the various circuits and equipments which form a stored program communication system in accordance with this invention; and FIG. 2 depicts the details of various circuits of an improved ring control circuit arranged to provide appropriate procedures for detecting requests for special services.

DETAILED DESCRIPTION

The organization of certain equipments in an electronic switching office 101 and customer stations CS1 to CSN which is necessary to the understanding of my invention is illustrated in FIG. 1. This electronic switching office 101 is designed to serve telephone calls including intraoffice calls and interoffice calls, the latter calls including calls made from remote switching offices to the switching office 101 illustrated in FIG. 1.

An intraoffice call is initiated from a customer station symbolically represented by telephone CS1 and is completed by way of the electronic switching office to another customer station which is symbolically represented by telephone CSN and display device DIS. An interoffice call from a remote switching office is initiated by a customer station at such remote switching office through remote trunk line RTL and then via the electronic switching office of FIG. 1 to a customer station, such as stations CS1 or CSN. The customer stations CS1 and CSN are connected to the switching office over telephone lines L1 and LN and are terminated in line link network LLN. Each customer station may include a conventional telephone set and a display device, such as an LED display DIS which will accept digital data and display such digital data as digits on the display device.

Line link network LLN, which terminates the telephone lines L1 and LN, includes switching facilities for establishing connections from telephone lines L1 to LN to trunk link network TLN and to junctor JR. In addition, line link network LLN includes a line scanner controlled by central processor CP for sensing calling requests in the form of "on-hook" and "off-hook" signals on the telephone lines L1–LN. Finally, line link network LLN includes controller apparatus operated in response to instructions from central processor CP for effecting the establishment of the connections of the lines in line link network LLN.

Junctor JR similarly includes switching facilities for establishing connections of lines from line link network LLN as well as scanning apparatus for sensing the conditions of the several lines and controlling apparatus for controlling the switching facilities for establishing the connections, all under control of instructions from central processor CP. Similarly, trunk link network TLN includes switching facilities for establishing connections over lines from line link network LLN to various equipments. Typical ones of these equipments include in/out trunk circuit IOT, ringing control circuit RC and digit receiver DR. The control of the switching facilities in trunk line network TLN is provided by controlling apparatus operated in response to instructions from central processor CP.

In/out trunk circuit IOT provides the termination remote trunk line RTL, which extends to the distant switching office and connects trunk line RTL to trunk link network TLN. Digit receiver circuit DR, when connected to a calling customer, provides dial tone and, when the customer dials, functions to receive the dialing signals. Ringing control circuit RC, when connected to a called party, supplies audible ringing thereto and senses the called customer answer. In accordance with this invention, ringing control circuit RC thereupon provides a time window to permit the called customer to request called party service.

Scanner SC under control of central processor CP provides the scanning of the conditions of in/out trunk IOT, ringing control circuit RC and digit receiver DR to determine, for example, the operation of in/out trunk IOT, the digits received by digit receiver DR and the various conditions and operations of ringing control circuit RC. Such conditions and operations of control circuit RC include the testing of the lines and links for foreign potentials, the answer or response of the called customer and, in accordance with this invention, the reception of a request for called party service from the called customer.

Signal distributor SD under instructions from central processor CP controls the operations of in/out trunk IOT, ringing control circuit RC and digit receiver DR. More specifically, signal distributor SD under control of signals from central processor CP causes the operation and subsequent release of various relays in the above-described circuits.

Communications between signal distributor SD, scanner SC, line link network LLN, trunk link network TLN, junctor JR and central processor CP are by way of bus system BUS, which comprises multiconductor cables. Processor CP is a centralized data processing facility which implements the various operation and maintenance functions of the switching system. It is divided functionally into three units comprising a call store CS, program store PS and central control CC. The call store CS is a temporary memory which stores information pertaining to calls in progress. Such information includes the busy/idle status of communication paths through the various networks in the switching office, the identity of customer stations making calling requests for service on lines L1–LN and the identity of called stations derived from translations of the digits received by digit receiver DR.

The program store PS is a semi-permanent memory which is employed to store the system programs and information relating to charging and routing on telephone calls and the like.

The central control CC is the processing unit of the system. It is capable of executing many types of instructions or orders required for controlling the line and trunk link networks, the trunk circuits, the ringing circuits and the digit receivers during the calls. These instructions which it executes are written in the form of programs stored in program store PS. The central control CC requests instructions from the program store and executes and commands the appropriate circuit or circuits to carry out the various functions. An electronic switching office arranged in this manner is disclosed in U.S. Pat. No. 3,570,008 issued to R. W. Downing et al. on Mar. 9, 1971.

Assume now that a customer at station CS1, for example, initiates a call to one of the other stations connected to the switching office, such as station CSN. When the caller removes the telephone handset, an "off-hook" signal is applied to line L1. This "off-hook" signal is sensed by the scanner of line link network LLN and read out by central control CC. Central control CC determines the calling line from the scanner "address" and consults the busy/idle information stored in call store CS for this line to determine if this is a change of condition from an "on-hook" to an "off-hook" signal. Upon concluding that this, in fact, is a change and that a call origination has occurred, central control CC updates the busy/idle information for line L1 in store CS. Central control CC, knowing the scanner address of line L1, refers to a translation area in program store PS which provides the service information for line L1 including the type of station. Central control CC thereupon selects an idle digit receiver DR, ascertains the availability of an idle path from line L1 through networks LLN and TLN to digit receiver DR by consulting the busy/idle information stored in call store CS for such paths and sends instructions to networks LLN and TLN via their control circuits to establish appropriate switching connections to connect line L1 to digit receiver DR. Central control CC then requests pulse distributor SD to operate apparatus in receiver DR to cause dial tone to be sent to calling line L1 and thereafter scans digit receiver DR to determine when digits (in the form of multifrequency tones) are received from the calling station, causing the dial tone to that station to be interrupted when the first digit is received.

After appropriate portions of the called number (such as the office code portion) have been received, central control CC affects translations of the digits in that portion to obtain various call routing and signaling information. In addition, central control CC obtains a reference code translation and routing information to indicate an intraoffice call and directions to allocate junctor circuit JR for use on the call. Central control CC then reserves an available communication channel through line link network LLN between the calling line L1 and junctor JR, converts the dialed number of the called customer line to a program store address to ascertain in program store PS the line equipment number and converts the line equipment number to the location of the called line busy/idle information in call store CS to determine if the called line is idle. If the line is idle, central control CC marks the line as busy, signaling the call store to update this information, and selects a path between the called line and ringing control circuit RC via line link network LLN and trunk link network TLN. Digit receiver DR is released and central control CC selects, reserves and records in the call store the network path for the talking connection from calling line L1 through line link network LLN, junctor JR and back through network LLN to the called line. At this point, central control CC orders pulse distributor SD to request ringing circuit RC to provide for various potential and leakage tests and subsequently sends orders to distributor SD to connect appropriate ringings signals to the called line (and at the same time sends appropriate orders to an audible ringing circuit, not shown, to send ring back to the calling line).

As disclosed in U.S. Pat. No. 3,378,650 issued to L. F. Goeller et al. on Apr. 16, 1968, when the called customer answers, the ringing circuit RC trips ringing and cooperates with the scanner to notify central control CC of the answer condition of the called line. In accordance with this invention, ringing control circuit RC, at this time, prepares a time window interval to enable the called station to request a called party service. In the event that such request is not made and the time window interval terminates, central control CC is notified that a called party service is not requested and thereupon cooperates with distributor SD to restore the ringing circuit RC to its initial condition, opening the path from this circuit through trunk line network TLN and to establish the reserved talking connection between the calling line and the called line by way of line link network LLN and junctor JR. The call conversation may then progress between the parties until a disconnect signal is sensed, whereupon the central control CC initiates a disconnect sequence.

In the event that the called party makes a request for called party service, this request is registered by ringing control circuit RC. At the termination of the time window interval, the request is sensed by the scanner to advise central control CC that a request for a called party service has been made. Central control CC will thereupon connect digit receiver DR to the called line to permit the called line to send appropriate digits defining the specific request desired and, as described above, will restore ringing circuit RC. The digits sent by the called subscriber are scanned by central control CC to provide the appropriate request or requests. For example, a called party request may comprise a request for an audio response identifying the calling party, a request for the digits identifying the number of the calling party or a request to transfer the call to another party.

Assume that this request is for the digits identifying the number of the calling party. The identity of the calling party has been obtained by the call store CS from the scanner setting obtained when the call originated, which calling party identity has been retained by the call store CS. Central control CC thereupon may obtain the identity (in the form of digits) of the calling party number from the call store for transmission back to the called party, which digits are then displayed by the called party LED display DIS.

After the called party service is provided, central control CC thereupon connects the calling and called parties through line link network LLN and junctor JR in the same manner as previously described. The call may then progress as described above, terminated upon the hang-up by one or the other of the parties.

Details of the ringing control circuit RC necessary to understand this invention are disclosed in FIG. 2. This ringing circuit includes tip and ring leads TA and RA, which are connectable as described above to the trunk line network TLN and thus selectively connected to the line loop of the called customer telephone (which in this case is presumed to be a tip party telephone). Ringing control circuit RC is arranged to provide various tests, such as foreign potential and leakage resistance tests through the use of circuitry not shown herein but described in detail in the Goeller et al. patent. Ringing control circuit RC also includes ringing current source RCS which provides an intermittent ringing signal for application to the called customer telephone. In addition, ringing control circuit RC senses the answer of the called party (going off-hook) and, in response thereto, trips the ringing signal. Ringing control circuit RC also provides scanning means to apprise common control CC of the states and conditions of these test results and these ringing functions. In accordance with the present invention, ringing control circuit RC also includes signal detector SIG for detecting requests for service from the called subscriber and monopulser MON for providing a time window during which the called subscriber has an opportunity to send the request for service signals.

Control of ringing control circuit RC is provided by central processor CP by way of signal distributor SD, which selectively operates and releases a plurality of magnetically latching relays, of which relays A and C are shown in FIG. 2 of this application. These relays are operated over individual leads from signal distributor SD in response to pulse signals supplied therefrom. Each of these relays includes an operating or make contact, such as make contacts A1 and C2 which together with series resistors R1 and R2 shunt the operating winding of the relay when operating in response to a momentary pulse on the associated leads LA and LC. Upon operating, the relay magnetically latches or locks its contacts in the actuated position and establishes the shunt path around its winding, increasing the current flow of the associated lead LA or LC. This current flow increase is detected by distributor SD, providing notification that the proper relay has been operated. Thereafter, the operated relay can be released in response to a momentary pulse potential on lead LA or LC which is of the opposite polarity to that of the operating potential.

Scanning of the various states or conditions of ringing control circuit RC is provided by scanner S2, which senses the conditions of various ferrods, such as ferrods FS2 and FS3 in ringing control circuit RC. Each of the ferrods, such as ferrods FS2 and FS3, has a sensing element which senses the presence or absence of current flow through a pair of control leads associated therewith, such as leads SL1 and SL2. The presence of a current in excess of a predetermined threshold results in the saturation of the ferrod. During a scanning operation, the central processor CP causes scanner S2 to selectively apply an interrogate pulse to an individual one of interrogate windings I of a selected one of the ferrods. If the ferrod is not saturated, this results in the interrogate pulse being coupled (by transformer action) to the read-out winding RO of the ferrod. On the other hand, if a sufficient current is flowing through the ferrod and the ferrod is thereby saturated, the interrogate pulse on winding I is essentially not coupled to the read-out winding RO. Scanner S2 being connected to the read-out windings can thus sense the saturated or unsaturated conditions of the ferrods and apply appropriate responses to central processor CP.

In the initial idle state the various relays of ring control circuit RC, such as magnetically latching relays A and C, and relays RT, RT1, RT2 and RT3, together with relays SD and MP, are all in their released state. It is assumed at this point that the processor CP has ordered the trunk link network TLN to interconnect the called customer line to leads TA and RA. Next, the processor CP and distributor SD control the ringing control circuit RC to test for foreign potential on the called line. As a consequence, distributor SD pulses line LA to thereby operate relay A. The operation of relay A completes certain paths in ringing control circuit RC not shown herein but shown and described in detail in the Goeller patent, to arrange for a foreign potential test. Processor CP and scanner S2 scan an appropriate ferrod and, assuming that there are no improper foreign potentials on the subscriber line, processor CP and distributor SD pulse line LC to operate relay C in preparation for a leakage resistance test. As a result of the operation of relay C, a path is completed by way of contacts A-5 and C-6 to the winding of relay RT1. Relay RT1 locks around contacts A-5 by way of contacts RT1-1 and RT-1.

The operation of relay C also connects the FS2 ferrod control leads in series with leads TA and RA. These connections are from leads TA via contacts C-7 (and portions of ringing control circuit RC which are not shown) and then via contacts RT2-2, resistor R7, resistor R12, contacts RT3-2 to control leads SL1 and then via the left control winding of ferrod FS2 to negative battery. The other connection is from lead RA via contact C-1 (and other circuitry not shown), contact RT2-3, resistor R8, resistor R13, contacts RT3-3 to control leads SL2 and then via the right control winding of ferrod FS2 to ground. At the same time, ferrod FS3 is shunted by contacts RT3-2 and RT3-3, precluding the connection of the ferrod in series with ferrod FS2 and leads TA and RA.

As disclosed in the Goeller patent, when the leakage resistance is below a predetermined threshold as between the tip and ring leads of the subscriber or in the office, a current is conducted through ferrod FS2 sufficient to saturate the ferrod. This saturation is detected by the central processor with the subsequent result that the ringing control circuit RC is released. Assuming, however, that the leakage test indicates that excessive leakage resistance is not present and ferrod FS2 is therefore not saturated, processor CP proceeds to release relay A to thereby apply ringing current to the called subscriber.

The release of relay A prepares an operating path for relays RT2 by way of contacts A-6 and RT1-2. Relay RT2 operated opens the previously described paths from the tip and ring leads TA and RA to the control windings of ferrod FS2. Operation of relay RT2 completes a circuit from ringing current source RCS to the telephone subscriber line. This path may be traced in part from ringing current source RCS over lead RCL, contact TR2-5, the winding of relay RT, contact RT2-4 and contact C-7 to lead TA and then by way of trunk link network TLN and line link network LLN to the tip lead of the called line. From the ring lead of the called line the circuit may be traced back through line link network LLN, trunk link network TLN, lead RA, contacts C1 and RT2-1, transformer XT and lead G to ground in ringing current source RCS.

Ringing current source RCS constitutes a grounded 20-cycle alternating current source wherein the ground side is connected to lead G and ringing current or, alternatively, the negative supply superimposed with 20-cycle ringing current is connected to lead RCL. Accordingly, a negative supply which, at ringing intervals, has ringing current superimposed thereon, is sent to the called subscriber.

When the call is answered, the switchhooks of the called party connect a resistance path across the tip and ring leads of the called line to complete the previously traced path through the winding of relay RT, and the relay operates due to the battery supply provided by ringing current source RCS. In operating, relay RT opens the locking path of relay RT1 and releases that relay. The release of relay RT1 removes ground from the operating winding of relay RT2. The consequent negative surge through the winding of relay RT2 is passed to monopulser MON and the monopulser proceeds to time, passing current through the winding of relay MP while timing to maintain relay MP operated for an interval of time. This interval is arranged to be of sufficient duration to give the called telephone subscriber who has just answered the call a time window for making a request for service. With relay MP operated, a shunting path is provided around ferrods FS2 and FS3 from the junction of resistors R7 and R12 via contacts MP-1 to negative battery and from the junction of resistors R8 and R13 via contacts MP-2 to ground. At the same time, the removal of ground from the winding of relay RT2 results in the release of this relay. This reconnects the tip and ring leads to resistors R7 and R8, as previously described, reconnects ferrods FS2 and FS3 (presently shunted) to the tip and ring leads and, it is to be noted, also connects the tip and ring leads to signal detector SIG. The release of relay RT2 also disconnects ringing current source RCS from the telephone subscriber line, thereby providing the functions of tripping the ringing and opening the operating path of relay RT which thereupon releases.

The shunted state or condition of the ferrods in ringing control circuit RC is maintained for the time window interval provided by monopulser MON. Ferrods FS2 and FS3 remain unsaturated so long as relay MP remains operated and scanning of the ferrods does not advise processor CP that the call has been answered. Ringing control circuit RC during this time window interval awaits a request for call party service from the called subscriber, which response will be in the form of a multifrequency tone corresponding to one of the digits.

Assume first that the called party does not make a request for service. The condition of ringing control circuit RC is unchanged until monopulser MON times out. Upon this time out, relay MP releases. This removes the shunting paths of ferrods FS2 and FS3 by way of contacts MP-1 and MP-2. The shunting path around ferrod FS3 via contacts RT3-2 and RT3-3 is maintained, however.

With the shunting path around ferrod FS2 removed, ferrod FS2 saturates due to the current from negative battery through the left-hand winding of ferrod FS2 to lead SL1 and then via the break contacts RT3-2 and resistors R12 and R7 and above-described path to the tip lead and continuing therefrom to the called subscriber's telephone, which has been answered, back through the ring lead and then via the above-described path through resistors R8 and R13 and break contacts RT3-3 to lead SL2 and continuing on through the right-hand winding of ferrod FS2 to ground. This consequent saturation of ferrod FS2 and the unsaturated condition of ferrod FS3 is subsequently scanned by processor CP. The processor thereupon orders pulse distributor SD to release relay C. The release of relay C disconnects ringing control circuit RC from the tip and ring leads of the answering subscriber and restores the ringing control circuit to its initial idle state.

Assume now that the called subscriber makes a request for called party service. This constitutes the application of a multifrequency tone (corresponding to a particular digit) to the tip and ring leads. The multifrequency tone is thus applied across signal detector SIG. The signal detector SIG, in turn, upon recognition of the particular multifrequency tone, applies current through the winding of relay SD. With relay SD operated, ground is passed through make contacts SD-1, MP-3 and C-7 to the winding of relay RT3. Relay RT3 thereupon operates and locks through its make contact RT3-1. In addition, the operation of relay RT3 removes the shunting path around ferrod FS3 by way of break contacts RT3-2 and RT3-3.

With the shunt now removed from around ferrod FS3, the current path via the called subscriber's tip and ring is now completed by way of lead SL1, the left-hand winding of ferrod FS3 and resistor R14 and also via resistor R15, the right-hand winding of ferrod FS3 to lead SL2. Accordingly, at the end of the time window interval, when relay MP releases, the current path through the subscriber line is now completed through ferrods FS2 and FS3, in series, saturating both the ferrods. Processor CP, in scanning the ferrods, determines that both ferrods are saturated. This constitutes advice that a request for called party service is being made and processor CP thereupon provides a register for the called party as described above. At the same time, processor CP orders pulse distributor SD to release relay C, releasing relay RT3, disconnecting ring control circuit RC from the called subscriber and restoring the ringing control circuit to the initial idle state as described above.

Although a specific embodiment of this invention has been shown and described, it will be understood that various modifications may be made without departing from the spirit and scope of this invention.

I claim:

1. In a switching system which includes common control means for connecting a source of ringing signals to a called subscriber line and for completing a call connection to the subscriber line, a ring control circuit including means responsive to an answer by the subscriber for tripping the ringing source, the tripping means including means for manifesting the subscriber answer, and means operated by the common control means for scanning the answer manifestation to initiate completion of the call connection, characterized in that the ring control circuit further includes means for delaying the manifesting of the subscriber answer for an interval of time after the answer by the subscriber without precluding the ringing source tripping to permit the subscriber to signal a request after ringing is tripped and before completion of the call connection and means responsive to the delaying means for detecting receipt of the request signal during the time interval.

2. The arrangement of claim 1, wherein the delaying means includes timing means responsive to the ring tripping for generating the time interval and means responsive to the timing means for rendering the answer manifesting means unresponsive to the subscriber answer until the termination of the time interval.

3. The arrangement of claim 1 or 2, wherein the detecting means includes means for manifesting the request signal receipt to advise the common control scanning means that the subscriber is making a request.

4. The arrangement of claim 3, wherein the delaying means includes means for delaying the manifesting of the request signal receipt until termination of the time interval.

5. A ringing control circuit for a communication system which includes common control means for completing a call connection to a called subscriber line, the ringing control circuit including a source of ringing signals for activating a ringing device of the called subscriber by way of the subscriber line, means responsive to a subscriber answer for interrupting the ringing signals source, a first sensing circuit for selectively sensing flow of current on the subscriber line due to the subscriber answer, means operated by the common control means for scanning conditions of the sensing circuit to initiate completion of the call connection when the subscriber answers, delay means responsive to the interrupting means for delaying the sensing by the sensing circuit for an interval of time without precluding the interrupting of the ringing signal source, and means operated by the delay means for detecting receipt of a request-for-service signal from the subscriber during the time interval.

6. A ringing control circuit, in accordance with claim 5, and further including a second sensing circuit responsive to the detecting means for selectively sensing flow of current on the subscriber line after receipt of the service request signal and means operated by the common control means for scanning conditions of the second sensing circuit.

7. A ringing control circuit, in accordance with claim 6, wherein the delay means further includes means for delaying the sensing by the second sensing circuit for the interval of time.

* * * * *